United States Patent
Dishman et al.

(10) Patent No.: US 8,159,160 B2
(45) Date of Patent: Apr. 17, 2012

(54) APPARATUS, SYSTEM, AND METHOD FOR IMPROVED FAN CONTROL IN A POWER SUPPLY

(75) Inventors: C. Charles Dishman, Raleigh, NC (US); Jen-Ching Lin, Apex, NC (US); Randhir S. Malik, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 765 days.

(21) Appl. No.: 12/346,399

(22) Filed: Dec. 30, 2008

(65) Prior Publication Data
US 2010/0164421 A1  Jul. 1, 2010

(51) Int. Cl.
*H02P 7/00* (2006.01)
(52) U.S. Cl. .... 318/268; 318/471; 318/478; 318/400.12
(58) Field of Classification Search ................. 318/268, 318/400.12, 717, 719, 471, 478, 479, 480, 318/599; 388/804, 811, 821
See application file for complete search history.

(56) References Cited

U.S. PATENT DOCUMENTS

| | | | |
|---|---|---|---|
| 6,380,704 B1 * | 4/2002 | Chin | 318/268 |
| 6,965,208 B2 | 11/2005 | Chen | |
| 7,054,721 B2 | 5/2006 | Malone et al. | |
| 7,256,562 B2 | 8/2007 | Lee | |
| 7,444,070 B2 * | 10/2008 | Hahn et al. | 388/809 |
| 7,583,043 B2 * | 9/2009 | Chung et al. | 318/634 |
| 7,619,380 B2 * | 11/2009 | Lo et al. | 318/268 |
| 7,768,222 B2 * | 8/2010 | Ahladas et al. | 318/471 |
| 7,880,421 B2 * | 2/2011 | Karwath | 318/644 |
| 2006/0006246 A1 | 1/2006 | Kim | |
| 2007/0145934 A1 | 6/2007 | Marando | |

FOREIGN PATENT DOCUMENTS

| | | |
|---|---|---|
| CN | 1869851 A | 11/2006 |
| KR | 20-1999-0040929 | 12/1999 |

OTHER PUBLICATIONS

Office Action received from Korean Intellectual Property Office on Apr. 26, 2011.

* cited by examiner

*Primary Examiner* — Walter Benson
*Assistant Examiner* — Thai Dinh
(74) *Attorney, Agent, or Firm* — Kunzler Needham Massey & Thorpe

(57) ABSTRACT

An apparatus, system, and method are disclosed for controlling fan speed in a power supply. The apparatus measures input power to the power supply and measures the output power provided by the power supply over an interval. The apparatus determines values for the input power and output power and, using the two, determines how much power has been dissipated in the power supply. Power dissipation values are associated with particular fan speeds, and the apparatus adjusts the speed of the fan in the power supply based on how much power was dissipated during the interval. Increasing levels of power dissipation increases the fan speed, and decreasing levels of power dissipation decrease the fan speed.

20 Claims, 6 Drawing Sheets

APPARATUS, SYSTEM, AND METHOD FOR IMPROVED FAN CONTROL IN A POWER SUPPLY

BACKGROUND

1. Field of the Invention

This invention relates to the field of power supplies, and particularly to cooling a power supply with a fan.

2. Description of the Related Art

The internal components of a power supply can generate a great deal of heat. Without appropriate cooling, these components can overheat and fail. Fans are commonly used in power supplies and computers to provide a relatively cheap cooling solution. In combination with additional elements, such as heat sinks for components that run particularly hot, most cooling problems can be solved with a fan.

However, it is generally not enough to simply place a fan in a power supply and run the fan at a constant speed. Running the fan at a constant high speed wears the components of the fan unnecessarily, wastes energy, and creates unnecessary noise. However, running the fan at a constant low speed prevents the fan from properly cooling the power supply when the power supply is running particularly hot. As a result, fans have control mechanisms to adjust the speed of the fan up and down based on the requirements of the power supply.

This requires, of course, a determination of how fast to run the fan at a particular moment. Prior art solutions often base fan speed on the temperature of the power supply. This, however, poses a host of problems. First, the ambient temperature of the power supply lags behind the temperature of the components themselves; as a result, the fan may not speed up in time. An additional problem is the placement of the devices that measure temperature in the power supply. The devices will naturally be sensitive to the temperature of components located nearby, but may not detect a rise in temperature of components located farther away. As a result, a component may fail since it does not contribute enough to the ambient temperature to register a change in fan speed.

Those in the art have tried to compensate for this shortcoming by making additional measurements. However, it can be difficult to tie additional parameters to temperature; for example, a very efficient power supply may deliver a high output power or output current without the components getting very hot. Prior art solutions force the fan to run unnecessarily fast in this case. In other situations, such as with a phase shift regulated power supply, the full bridge MOSFETs run very hot even though the output power and current are very low. In this case, the fan may fail to detect the heat quickly enough and the power supply can fail.

BRIEF SUMMARY

From the foregoing discussion, it should be apparent that a need exists for an apparatus, system, and method that provides for better fan speed control in a power supply. Beneficially, such an apparatus, system, and method would adjust the speed of the fan based on the actual need of the components in a substantially instantaneous manner.

The present invention has been developed in response to the present state of the art, and in particular, in response to the problems and needs in the art that have not yet been fully solved by currently available power supply cooling systems. Accordingly, the present invention has been developed to provide an apparatus, system, and method for controlling fan speed in a power supply that overcome many or all of the above-discussed shortcomings in the art.

In one embodiment, the apparatus includes an input power module that measures, over an interval, input power at an input terminal for the power supply and calculates an input power value. The apparatus also includes an output power module that measures, over the interval, output power at an output terminal for the power supply and calculates an output power value.

The apparatus also includes a fan control apparatus. The fan control apparatus receives the input power value from the input power module and the output power value from the output power module and calculates a power value representing the power dissipated by the power supply over the interval based on the difference between the input power value and the output power value. The fan control apparatus then looks up a fan speed associated with the power value in a lookup table that associates increasing power dissipation values with increasing fan speeds such that higher power dissipation values correspond to higher fan speeds. The fan control apparatus also sends the fan speed to a fan controller of a fan that cools the power supply.

The apparatus to control fan speed is, in one embodiment, provided with a plurality of modules configured to functionally execute the necessary steps. These modules in the described embodiments include an input power module, an output power module, a dissipation module, and a fan module. In one embodiment, the input power module measures input power of a power supply and calculates an input power value. The output power module measures output power of the power supply and calculates an output power value. A dissipation module calculates a power dissipation value representing power dissipated by the power supply using the input power value calculated by the input power module and the output power value calculated by the output power module. Finally, the fan module adjusts the speed of the fan based on the power dissipation value. The fan module increases the fan speed if power dissipation in the power supply increases, and decreases the fan speed if power dissipation in the power supply decreases. Thus, the fan cools the power supply.

In one embodiment, the fan is driven by a pulse-width modulated ("PWM") fan controller, and adjusting the speed of the fan involves the fan module providing the PWM fan controller with a pulse width value that is associated with the power dissipation value. In one embodiment, a lookup table associates pulse width values with power dissipation value ranges. The fan module receives the power dissipation value from the dissipation module, retrieves the pulse width value associated with the power dissipation value in the lookup table, and sends the pulse width value to the PWM fan controller.

In another embodiment, the fan is controlled by voltage regulation, and adjusting the speed of the fan involves the fan module providing a fan controller with a voltage value that is associated with the power dissipation value. In another embodiment, the fan is controlled by resistance regulation, and adjusting the speed of the fan involves the fan module providing a fan controller with a resistance value that is associated with the power dissipation value.

In one embodiment, the input power value is an average input power over an interval and the output power value is an average output power over an interval. In one embodiment, the input power module measures input power by sensing input voltage and input current to the power supply and calculates the input power value from the input voltage and input current. Similarly, the output power module measures output power by sensing output voltage and output current of the power supply and calculates the output power value from the output voltage and output current.

In another embodiment, the input power module measures input power by assuming an input voltage value and sensing the input current to the power supply. The input power module then calculates the input power value from the assumed input voltage value and measured input current. Similarly, the output power module measures output power by assuming an output voltage value and sensing the output current to the power supply, and then calculates the output power value using the assumed output voltage value and measured output current.

In another embodiment, measuring input power involves the input power module measuring input power at a location that is not the input terminal of the power supply where the current is proportional to the input current. Similarly, measuring output power can involve the output power module measuring output power at a location that is not the output terminal of the power supply where the current is proportional to the output current.

In certain embodiments, calculating the power dissipated by the power supply involves subtracting the output power value from the input power value. The power dissipation value may also require adjustments using one or more constants.

In further embodiments, the apparatus includes a lag module that increases the fan speed for a lag interval in response to determining that the power dissipated by the power supply is decreasing.

A system of the present invention is also presented for controlling fan speed in a power supply. The system may be embodied power supply. In particular, the system, in one embodiment, includes a power supply that receives input voltage from a power source and provides a regulated output voltage to an electronic load. The system also includes an input power module, output power module, dissipation module, and fan module described above. The system may also include an electronic load such as a computer, a blade system, or an appliance. In certain embodiments, the input voltage is either AC or DC, and the regulated output voltage is either AC or DC.

A method of the present invention is also presented for controlling fan speed in a power supply. The method in the disclosed embodiments substantially includes the steps necessary to carry out the functions presented above with respect to the operation of the described apparatus and system. In one embodiment, the method includes measuring input power of a power supply and calculating an input power value over an interval using the measurements of the input power. The method also may include measuring output power of the power supply and calculating an output power value over an interval using the measurements of the output power.

In a further embodiment, the method includes calculating a power dissipation value representing power dissipated by the power supply by subtracting the input power value from the output power value. The method also includes increasing the speed of a fan that cools the power supply in response to an increase in the power dissipation value and decreasing the fan speed in response to a decrease in the power dissipation value. The method may also include associating a plurality of fan speeds with a plurality of power dissipation value ranges in a lookup table.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
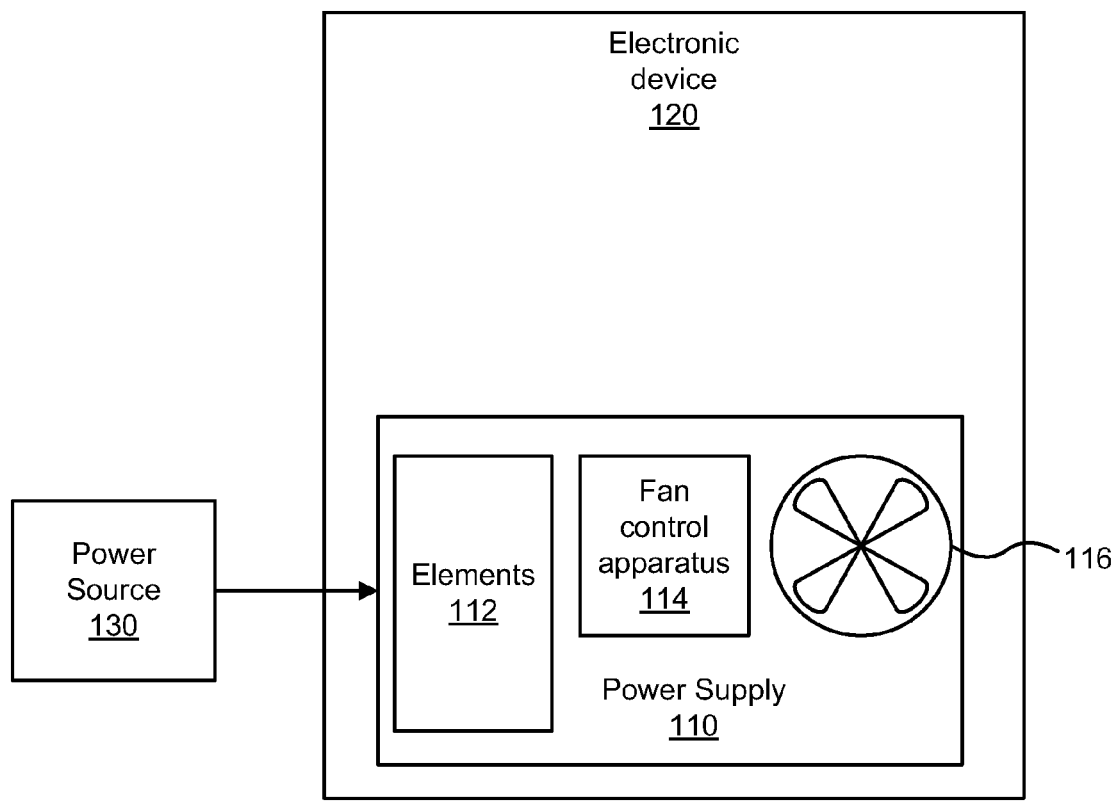
FIG. 1 is a schematic block diagram illustrating one embodiment of a power supply in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 depicts a system in accordance with the present invention. The system includes an electronic device 120, a power source 130, and a power supply 110. The electronic device 120 is a device that receives power from the power supply 110. The electronic device 120 is an electronic load for the power supply 110. The electronic device 120, for example, may be a computer (such as a laptop or a desktop computer), a blade server system, an appliance, or other device that receives power from a power supply such as the depicted power supply 110. The electronic device 120 may receive power from multiple power supplies 110. While FIG. 1 depicts the power supply 110 as being internal to the electronic device 120, in certain embodiments the power supply 110 is external to the power supply 110.

The electronic device 120 receives power from the power supply 110. The power supply 110 receives power from the power source 130 and conditions the signal such that it arrives in a form suitable for use by the electronic device 120. Depending on the needs of the electronic device 120, the power supply 110 may provide a DC or an AC output. The power supply 110 is made up of various elements 112 that allow the power supply to condition the signal and provide appropriate output for the electronic device 120. The elements 112 may be MOSFETs, BJTs, inductors, capacitors, resistors, transformers, and other common electrical components found in power supplies.

The power source 130 provides an input signal to the power supply 110. The power source 130 can be any source of electric power known in the art. For example, the power source 130 may be a generator or a standard electrical outlet. The power source 130 may provide the power supply 110 with either a DC or AC input.

The power supply 110, like all devices, is not perfectly efficient. Thus, some of the power received from the power source 130 is lost in the power supply 110 and not delivered to the electronic device 120. In many instances, this lost power is given up in the power supply 110 as heat. Without proper care, the heat may melt or destroy certain elements 112 of the power supply 110. Because the load conditions for the power supply 110 and the operations of the power supply 110 are not always constant, the efficiency of the power supply 110 may vary. The fan 116 is part of a system that helps cool the power supply 110 and maintains an appropriate operating temperature.

In accordance with the present invention, the power supply 110 includes a fan control apparatus 114 that regulates the speed of the fan 116 based on the power lost in the power supply 110. As increasing amounts of power are dissipated in the power supply 110, the fan control apparatus 114 increases the speed and cooling capacity of the fan 116. As the level of power dissipation lowers, the fan control apparatus 114 reduces the fan speed in order to save energy and reduce noise.

Because power dissipation is based on the power supply 110 as a whole, fan speed can be adjusted more accurately than if the speed is based on temperature alone. As a result, the power supply 110 can react instantaneously to changes in power dissipation and thus anticipate rising or falling temperatures. Nor does the power supply 110 suffer from lag problems that occur when elements 112 are running hot but have not yet raised the ambient temperature of the power supply 110 sufficient to trigger a change in fan speed as in prior art systems. By reacting to the cause of temperature problems (i.e., power lost in the power supply 110) instead of the symptoms (i.e., an actual change in temperature) the fan control apparatus 114 anticipates the cooling needs of the power supply 110 and can meet those needs more efficiently.

Figure 2:
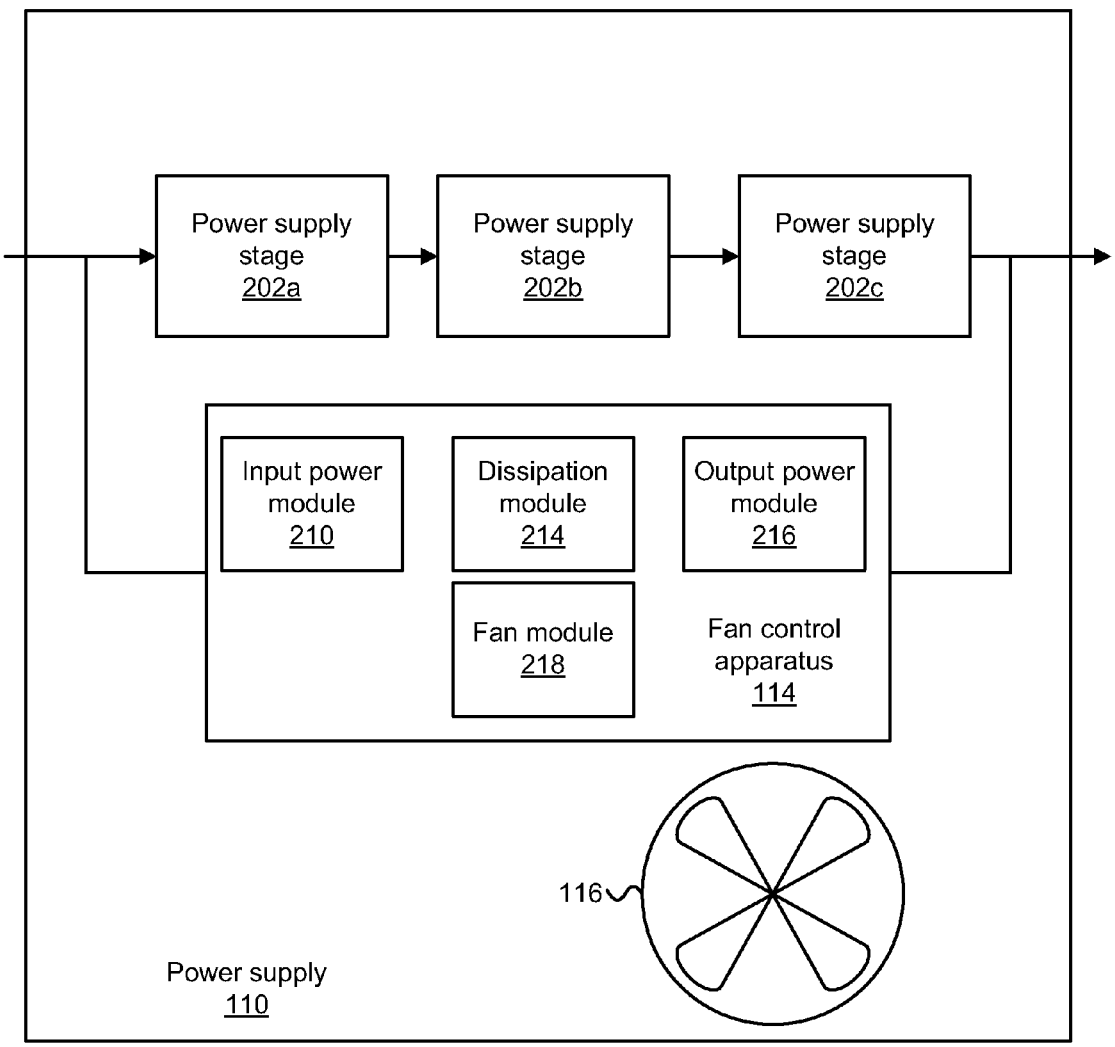
FIG. 2 is a schematic block diagram illustrating one embodiment of a fan control apparatus in accordance with the present invention.

FIG. 2 shows one embodiment of a power supply 110 that includes a fan control apparatus 114. In the depicted embodiment, the power supply 110 is a multi-stage power supply that includes power supply stages 202a-c. The power supply stages 202a-c may provide a variety of functions for the power supply 110 such as signal rectification, filtering, power factor correction, and others. Power supply stages 202a-c may be, for example, boosts, bucks, buck-boosts, flybacks, Ćuks, combinations thereof, and other topologies known to those in the art. In various embodiments, the power supply 110 may have a single power supply stage 202a or any other number of power supply stages 202a-n.

As shown, the fan control apparatus 114 includes an input power module 210, a dissipation module 214, an output power module 216, and a fan module 218. The input power module 210 measures input power to the power supply 110 and calculates a value that represents that input power, referred to herein as an input power value. In one embodiment, the input module 210 is a power meter that measures voltage and current at the input terminals of the power supply 110. The input power value may be an average power measured over an interval. In certain embodiments, the input power values are calculated using root mean square ("rms") values for the input voltage and input current. Those of skill in the art will appreciate how to measure and quantify AC and/or DC power that is measured by input power module 210.

In one embodiment, the input power module 210 measures the input power at the input terminals of the power supply 110. In another embodiment, the input power module 210 measures the input power at a different location in the power supply 110 (for example, after rectification and filtering). The input power module 210 may, for example, measure input power after a first power supply stage 202a. In certain embodiments, this involves measuring the input power at a location where the current is proportional to the input current. In such embodiments, the measured input current may require some correction (such as multiplying the measured value by a constant) in order to accurately reflect the actual input current. For example, a scalar constant may account for losses in the rectification stage of the power supply 110 if the input current and/or voltage are measured after the rectification.

In one embodiment, measuring input power involves measuring input current and assuming an input voltage level. As used in this application, measuring input power does not require physically measuring both current and voltage; rather, it means that at least one of these values must be measured. For example, a designer may make an assumption as to the input voltage provided to the power supply 110 since the voltages provided by power sources are generally well-defined beforehand and relatively stable. This assumption may be particularly true if the input current is measured after one or more power supply stages 202a-c since, at these locations, the voltage in the power supply 110 is typically predefined, tightly controlled, and thus relatively constant.

Input current may be measured using a resistor, a current sensor, or other current measurement approach known to those in the art. Methods for measuring voltage are similarly known in the art. The United States patent application of Cecil Dishman, Eino Lindsfors, and Randhir Malik entitled Apparatus, System, and Method for Determining Voltage, Current, and Power in a Switching Regulator (Ser. No. 11/970,779), filed on 8 Jan. 2008, and incorporated herein by reference, discloses novel approaches to measuring current and voltage in a switched mode power supply which may be used in the present invention.

The output power module 216 measures the output power of the power supply and calculates an output power value. The comments and explanations above with respect to the input power module 210 may also, in many circumstances, apply to the output power module 216 with the notable difference being that the relevant power is output power as opposed to input power. Thus, the output power module 216 may measure the output power over an interval and provide an average output power value in response. In addition, the output power module 216 may assume either the voltage or current value, assuming the value is relatively constant, and measure the other in order to measure the output power. The measurements may be made at the output terminal of the power supply 110 or at another location in the power supply 110 where the output current is proportional to the current measured at this other location. Calculating the output current may then involve correcting the measured current appropriately to reflect the output current.

In certain embodiments, the power supply 110 provides multiple outputs. For example, in a computer it is common to have a power supply 110 provide 3.3 V, 5V, and 12V. In such an embodiment, the output power module 216 accounts for all output power leaving the power supply 110 through the various connections. In one embodiment, the output power module 216 measures output power at each output terminal of the power supply 110 and calculates an output power value that represents the sum of power at each output terminal. Alternatively, the output power module 216 measures the output power at one output terminal (perhaps the output terminal transferring the most power) and estimates the output power at the other terminals.

Both input and output power can be measured instantaneously. In other embodiments, input and output power are measured over an interval. As used in this application, measuring over an interval encompasses a variety of methods to take measurements and affix an appropriate value representing either input or output power for some period of time. For example, an average or a median value can be used as the input or output power value. The input and output power may be sampled and an average taken to determine the input or output value. In some embodiments, a single measurement may be taken at regular intervals. In addition, resistive-capacitive ("RC") time constants can be used to take what is the equivalent of an average of the input or output power. Those of skill in the art will appreciate the variety of ways that one might ascribe an input power value or output power value to measurements taken over a time interval.

The fan control apparatus 114 also includes a dissipation module 214. The dissipation module 214 calculates a power dissipation value representing power dissipated by the power supply 110. The dissipation module 214 uses the input power value (provided by the input power module 210) and the output power value (provided by the output power module 216) to determine the power dissipation value. In one embodiment, the dissipation module 214 subtracts the output power value from the input power value and thus determines the difference and the amount of power actually lost in the power supply 110. In certain embodiments, the dissipation module 214 may adjust the power dissipation value calculated by taking a difference with one or more constants. For example, this adjustment may account for losses in the power supply 110.

The power dissipation value thus represents the power lost in the power supply 110 during the relevant measurement interval in instances where the input power value and output power value are averages over the measurement interval. Regardless of the particulars of implementation, the power dissipation value represents an approximation of the actual power lost in the power supply 110. This power lost can be associated with a particular level of expected heat and, thus, a particular fan speed. And while not all of the lost power is to heat (for example, some power may be lost as noise, vibration, etc) a large amount of the lost power manifests itself as heat. As a result, the power dissipation value can be viewed as a relatively accurate approximation of the thermal energy generated in the power supply 110.

In one embodiment, rather than measure the input power and output power of the power supply 110 as a whole, the fan control apparatus 114 may measure the input and output power of one or more of the power supply stages 202a-c. By so doing, the fan control apparatus 114 may obtain a more granular picture of where the power dissipation (and, thus, the heat) is greatest in the power supply 110. This may be useful in systems with more than one fan 116 since it would allow the fan control apparatus 114 to localize where in the power supply 110 the loss is occurring. It may also be useful where one particular power supply stage 202a-c is more sensitive to heat than others. It may also be useful in situations where there are losses in the early power supply stages 202a-c of the power supply 110 but power is never propagated to the end of the power supply 110; that is, where the output power is very small but there are still losses in the power supply 110.

The fan control apparatus 114 also includes a fan module 218 that adjusts the speed of the fan 116 based on the power dissipation value as calculated by the dissipation module 214. The fan module 218 increases the fan speed when it registers an increase in the power being dissipated by the power supply 110 and decreases the fan speed when it detects a decrease in the power dissipation level. The fan module 218 may either pull the power dissipation value from the dissipation module 214 or the power dissipation value may be pushed to the fan module 218. The behavior of the fan module 218 is described in greater detail in connection with FIG. 3.

Figure 3:
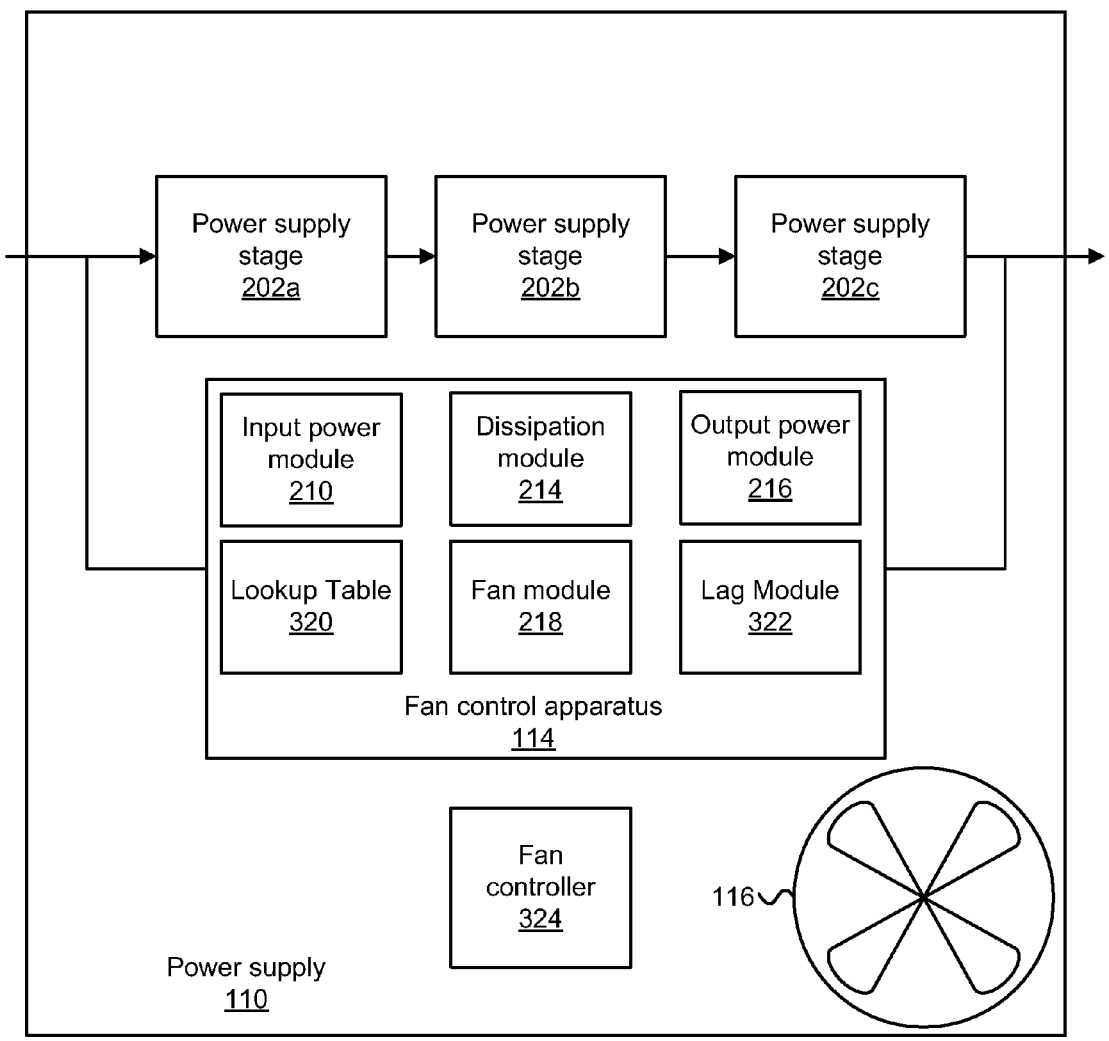
FIG. 3 is a second schematic block diagram illustrating one embodiment of a fan control apparatus in accordance with the present invention.

FIG. 3 illustrates a second embodiment of a fan control apparatus 114 in accordance with the present invention. In the depicted embodiment, the fan control apparatus 114 also includes a lookup table 320. The lookup table 320 associates a range of power dissipation values with associated fan speed parameters that determine the fan speed such as a pulse-width, voltage, or resistance, as described in more detail below. Rather than have a particular fan speed parameter for each possible power dissipation value, the lookup table 320 may specify a fan speed parameter for a range of power dissipation values. For example, it may specify a low fan speed when the power dissipation value is below a certain value, and a maximum fan speed when the power dissipation is above a certain value. For those power dissipation values between the two extremes, intermediate fan speeds may be assigned to ranges of values. Increasing fan speeds are associated with increasing power dissipation values such that higher power dissipation values correspond to higher fan speeds.

In other embodiments, the fan control apparatus 114 does not use a lookup table 320, but another approach to specify appropriate fan speeds. Thus, the fan control apparatus 114 may not have a lookup table 320. For example, the fan module 218 may associate fan speeds with power dissipation values using code made up of 'if' statements. Those of skill in the art will appreciate other approaches to associating power dissipation values with fan speeds. In other embodiments, the fan module 218 may associate fan speeds with power dissipation values by multiplying the power dissipation values by a constant, by using the power dissipation values as an input to an equation that calculates a desired fan speed, etc.

In one embodiment, the fan 116 and associated fan controller 324 make up a pulse-width modulated ("PWM") fan. A PWM fan controls fan speed by rapidly switching the power to the fan 116 on and off. The relative on/off time determines the average voltage seen by the fan 116 and, thus, its speed. For example, a fan 116 driven by a 12 Volt supply may have the fan controller 324 switching the 12 V supply on and then off for equal amounts of time. With this 50% on, 50% off supply, the fan 116 will see an average voltage of 6 V and operate at half-speed. Changing the on/off ratio changes the average voltage seen by the fan 116, and thus, changes the speed of the fan. In typical embodiments, the fan controller 324 switches the supply to the fan 116 on and off at a rate of approximately 30 Hz.

In such an embodiment, the lookup table 320 may store and associate pulse width values with power dissipation value ranges. The fan module 218 retrieves pulse width values from the lookup table 320 after receiving the power dissipation value representing the amount of power dissipated by the power supply 110 and sends that pulse width value to the fan controller 324.

The fan 116, however, need not be a PWM fan. The fan may be a voltage regulated fan. In such an embodiment, the fan controller 324 varies the voltage fed to the fan 116 directly and thus changes the fan speed. In such an embodiment, the lookup table 320 associates voltage values with power dissipation value ranges. The fan module 218 determines a voltage value associated with the power dissipation value received from the dissipation module 214 and sends that voltage value to the fan controller 324.

Similarly, the fan 116 may be controlled by varying a resistance value (as in a rheostat fan). In such an embodiment, the fan 116 is controlled by regulating the resistance. The fan module 218 provides the fan controller 324 with a resistance value that is associated with the power dissipation value reported by the dissipation module 214.

Those of skill in the art will appreciate that a variety of control means are available by which the fan controller 324 controls the speed of the fan 116. The present invention is not limited to any particular implementation, and may be configured to respond to a variety of different control mechanisms.

In certain embodiments, the power supply 110 imposes special conditions on the fan speed 116 in circumstances such as when the electronic load is started (for example, when a blade center is turned on) or when the electronic load is removed or turned off. The fan control apparatus 114 may not control powering the electronic load in these circumstances, and may hand off or receive control from other control components of the power supply 110 as part of normal operations.

FIG. 3 also shows a lag module 322. The lag module 322 increases the fan speed for a lag interval, as determined by the designer of the fan control apparatus 114, if the power dissipated by the power supply 110 decreases. If, for example, the power dissipation values have been high for an extended period of time such that the power supply 110 is running very hot, it may be desirable to continue to run the fan 116 at a high speed even after the power dissipation by the power supply 110 drops in order to continue cooling the residual heat. In some embodiments, the inherent mechanical lag of the fan may provide enough of a lag to meet the purposes of the power supply 110. For example, if the power dissipation drops suddenly, there is inherent lag between the time of the actual drop in power dissipated, when the drop is sensed by the fan control apparatus 114, when the fan control apparatus 114 adjusts the speed of the fan 116, and when the fan actually reduces to that speed. In certain embodiments, however, additional lag may be desirable.

To meet this need, the lag module 322 continues to operate the fan at a higher speed than that normally called for by the fan module 218. In one embodiment, the lag module 322 is activated when there is a sudden drop in power dissipation after the power supply 110 has been dissipating large amounts of power for a particular interval. For example, even a large drop in power dissipation may not invoke the lag module 322 if the power supply 110 had not been dissipating large amounts of power prior to the drop. Similarly, the length of the lag interval and the speed at which the fan 116 operates during that interval may be a function of both the severity of the drop in power dissipation and the length of time at which the power supply 110 was dissipating high amounts of power prior to the drop.

Figure 4:
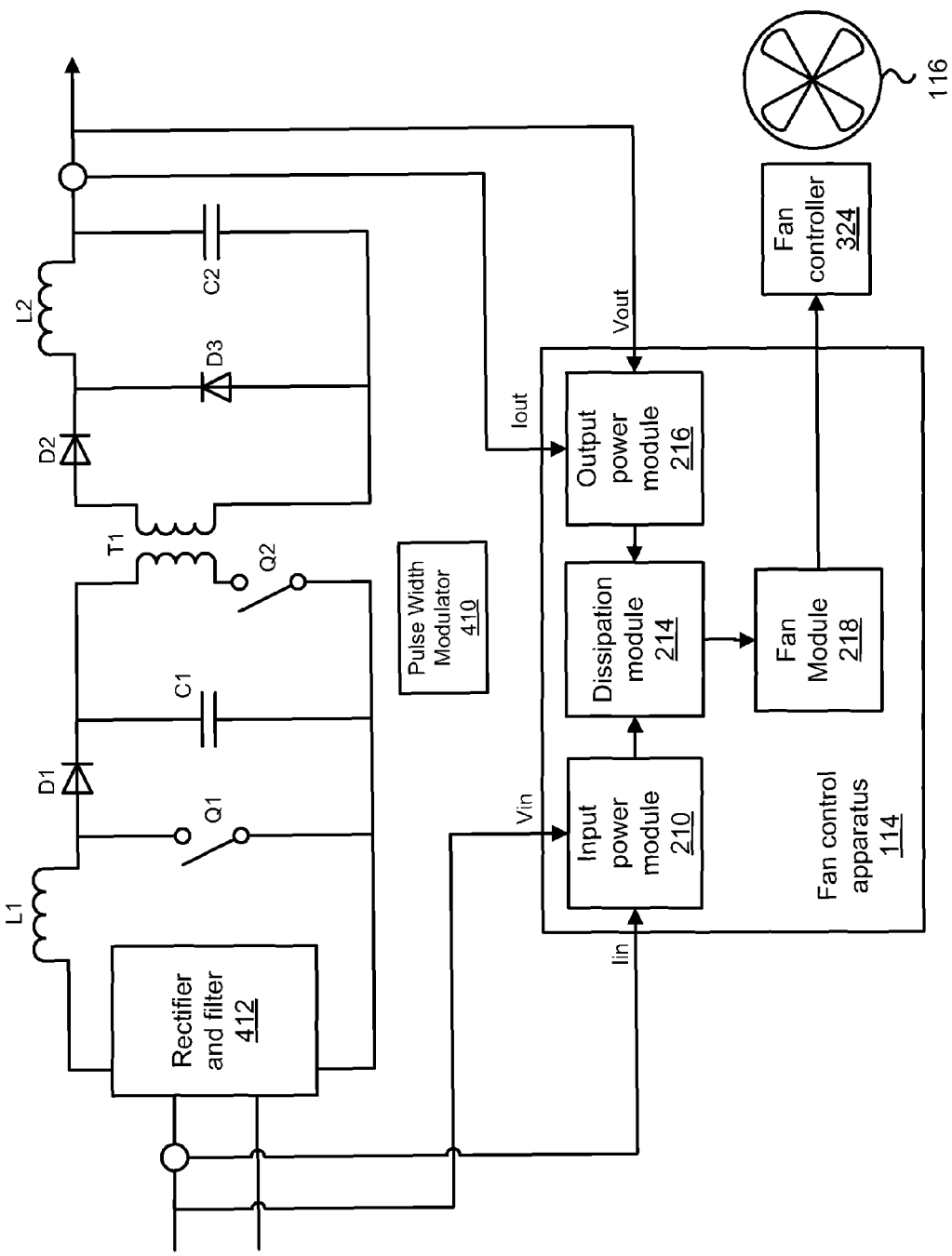
FIG. 4 is a schematic block diagram illustrating one embodiment of an implementation of a power supply with a fan control apparatus in accordance with the present invention.

FIG. 4 illustrates one embodiment of a power supply having a fan control apparatus 114 as described above. The input filter and rectifier stage 412 converts the AC input line voltage into DC through rectification. The input filter and rectifier stage 412 also filters certain frequencies and limits occurrences of electromagnetic interference ("EMI"). In typical embodiments, the input filter and rectifier stage 412 is the first stage through which an AC input line voltage is passed. As mentioned above, the input power module 210 may measure the input power before the rectifier and filter 412 or may alternatively measure the input power at a different location. In the depicted embodiment, the input power module 210 measures both the input current and the input voltage before the rectifier and filter 412.

FIG. 4 shows a multi-stage switching power supply. The switching power supply is divided into multiple stages that make use of inductors (such as L1 and L2), diodes (such as D1, D2, and D3), capacitors (such as C1, C2), transformers (such as T1) and switches such as Q1 and Q2. Also shown is a pulse width modulator 410 that controls the duty cycle and associated rates of switching of Q1 and Q2.

The design and operations of switching power supplies is tangential to the present patent; thus, the operations of the depicted circuit are not explained in detail. The power supply may have more or fewer stages of various configurations. A constant across all possible configurations of the power supply is that, as energy passes from the input of the power supply through the various stages depicted to the output, losses occur in the elements that make up the power supply. Additional losses may occur in the wires or connections between the various components. Much of this loss is manifested as heat.

As shown, and as described above, the fan control apparatus 114 controls the fan speed for the power supply. As shown, the input power module 210 measures, over an interval, an input power value representing the input power at the input terminal of the power supply. The output power module 216 measures the output power over the interval and provides an output power value representing the power at the output terminal of the power supply. The input power module 210 and the output power module 216 may be part of the fan control apparatus 114 or, alternatively, may be implemented independent of the fan control apparatus 114.

The fan control apparatus 114 receives the input power value from the input power module 210 and the output power value from the output power module 216. It then calculates a power value representing the power dissipated by the power supply over the interval based on the difference between the input power value and the output power value. The fan control apparatus 114 also looks up a fan speed associated with the power value in a lookup table that associates increasing power dissipation values with increasing fan speeds such that higher power dissipation values correspond to higher fan speeds, as explained above. The fan control apparatus 114 then sends the fan speed to the fan controller 324 of the fan 116 cooling the power supply.

Figure 5:
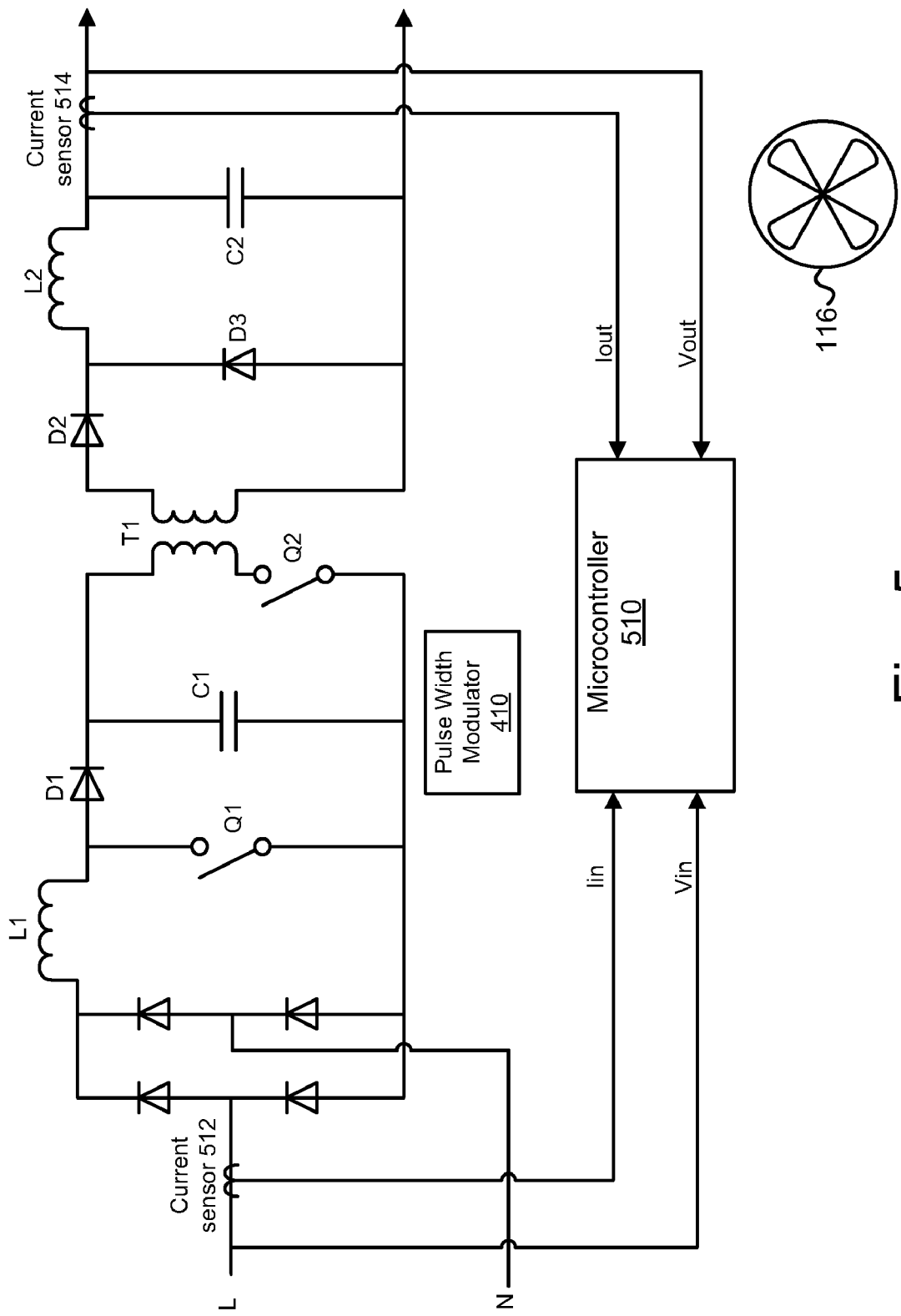
FIG. 5 is a second schematic block diagram illustrating one embodiment of an implementation of a power supply with a fan control apparatus in accordance with the present invention.

FIG. 5 shows an additional implementation of a power supply with a fan control apparatus 114. In the depicted embodiment, current is measured by a current sensor 512 and 514 that is a current transformer. Those of skill in the art will appreciate that the output AC current of the current transformers 512 and 514 is a fraction of, and proportionate to, the AC current being measured. In other embodiments, current is measured with a hall effect device or a resistor.

In the depicted embodiment, the fan control apparatus may be implemented in a microcontroller 510. The microcontroller 510 communicates fan speed parameters to the fan 116 based on the amount of power dissipated in the power supply. In one embodiment, the fan controller 324 discussed above is also incorporated into the microcontroller 510. The microcontroller 510 contains code that enables it to perform the various steps of the method described in connection with FIG. 6.

Figure 6:
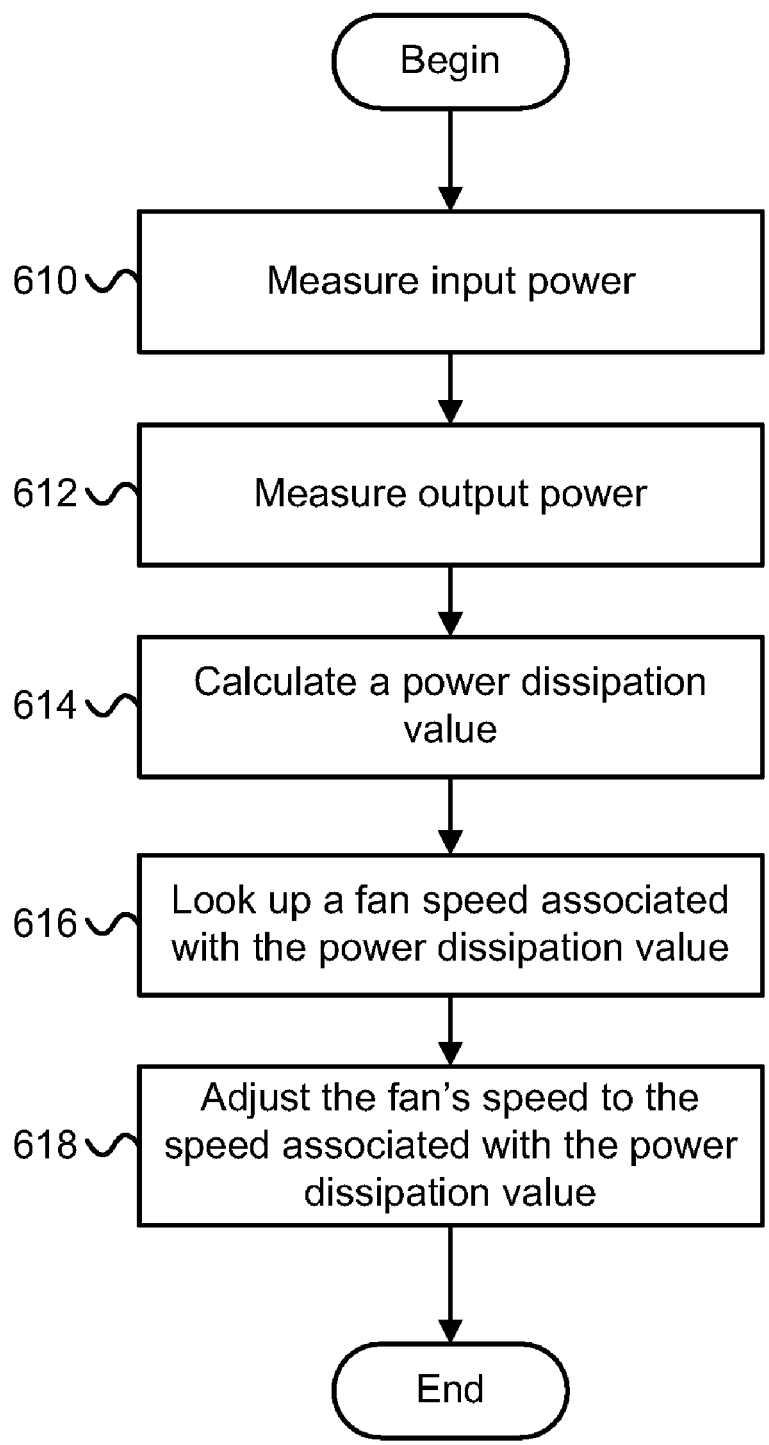
FIG. 6 is a schematic flow chart diagram illustrating one embodiment of a method for controlling fan speed in accordance with the present invention.

FIG. 6 illustrates a method for controlling fan speed in a power supply. The method includes measuring 610 input power to the power supply that is cooled by the fan and measuring 612 output power of the power supply. In one embodiment, these steps are performed, respectively, by the input power module and output power module described above. In one embodiment, the input power and output power are measured over the same interval. An input power value is then calculated using the input power measured over the interval. In one embodiment, the input power value is the average power measured over the interval. Similarly, an output power value can be calculated using the output power measured over the interval and may be an average of the output power measured over the interval.

The method also includes calculating 614 the power dissipated by the power supply. Calculating power dissipation, in some embodiments, includes calculating a power dissipation value representing the power dissipated by the power supply by subtracting the output power value from the input power value. The method also includes looking up 616 a fan speed associated with the power dissipation value. The term fan speed encompasses an actual fan speed and fan speed parameters that set the fan speed such as PWM, voltage, etc. The method also includes adjusting 618 the fan's speed to the speed that is associated with the power dissipation value.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus for controlling fan speed in a power supply, the apparatus comprising:
   an input power module that measures, over an interval, input power at an input terminal for the power supply and calculates an input power value;
   an output power module that measures, over the interval, output power at an output terminal for the power supply and calculates an output power value;
   a fan control apparatus that:
      receives the input power value from the input power module and the output power value from the output power module;
      calculates a power value representing the power dissipated by the power supply over the interval based on the difference between the input power value and the output power value;

looks up a fan speed associated with the power value in a lookup table that associates increasing power dissipation values with increasing fan speeds such that higher power dissipation values correspond to higher fan speeds; and sends the fan speed to a fan controller of a fan that cools the power supply.

2. An apparatus for controlling fan speed in a power supply, the apparatus comprising:
an input power module that measures input power of a power supply and that calculates an input power value, the power supply comprising one or more stages;
an output power module that measures output power of the power supply and calculates an output power value;
a dissipation module that calculates a power dissipation value representing power dissipated by the power supply using the input power value calculated by the input power module and the output power value calculated by the output power module; and
a fan module that adjusts a speed of a fan based on the power dissipation value, the fan module increasing the fan speed in response to an increase in power dissipation and decreasing the fan speed in response to a decrease in power dissipation, wherein the fan cools the power supply.

3. The apparatus of claim 2, wherein the fan is driven by a pulse-width modulated ("PWM") fan controller, and wherein adjusting the speed of the fan comprises the fan module providing the PWM fan controller with a pulse width value that is associated with the power dissipation value.

4. The apparatus of claim 3, further comprising a lookup table that associates a plurality of pulse width values with a plurality of power dissipation value ranges, wherein the fan module receives the power dissipation value from the dissipation module, retrieves the pulse width value associated with the power dissipation value in the lookup table, and sends the pulse width value to the PWM fan controller.

5. The apparatus of claim 2, wherein the fan is controlled by voltage regulation, and wherein adjusting the speed of the fan comprises the fan module providing a fan controller with a voltage value that is associated with the power dissipation value.

6. The apparatus of claim 2, wherein the fan is controlled by resistance regulation, and wherein adjusting the speed of the fan comprises the fan module providing a fan controller with a resistance value that is associated with the power dissipation value.

7. The apparatus of claim 2, wherein the input power value is an average input power over an interval and wherein the output power value is an average output power over an interval.

8. The apparatus of claim 2, further comprising one or more of the input power module measuring input power by sensing input voltage and input current to the power supply and calculating the input power value from the input voltage and input current, and the output power module measuring output power by sensing output voltage and output current of the power supply and calculating the output power value from the output voltage and output current.

9. The apparatus of claim 2, further comprising one or more of the input power module measuring input power by assuming an input voltage value and sensing the input current to the power supply and calculating the input power value from the assumed input voltage value and input current, and the output power module measuring output power by assuming an output voltage value and sensing the output current to the power supply and calculating the output power value from the assumed output voltage value and output current.

10. The apparatus of claim 2, wherein measuring input power comprises the input power module measuring input power at a location where a current at the location is proportional to an input current, and wherein the location is not an input terminal of the power supply.

11. The apparatus of claim 2, wherein measuring output power comprises the output power module measuring output power at a location where a current at the location is proportional to an output current, and wherein the location is not an output terminal of the power supply.

12. The apparatus of claim 2, wherein calculating the power dissipated by the power supply comprises subtracting the output power value from the input power value.

13. The apparatus of claim 12, further comprising adjusting the power dissipation value calculation with one or more constants.

14. The apparatus of claim 2, further comprising a lag module that increases the fan speed for a lag interval in response to determining that the power dissipated by the power supply is decreasing.

15. A system for controlling fan speed in a power supply, the system comprising:
a power supply that receives input voltage from a power source and provides a regulated output voltage to an electronic load;
an input power module that measures input power of a power supply comprising one or more stages and that calculates an input power value;
an output power module that measures output power of the power supply and calculates an output power value;
a dissipation module that calculates a power dissipation value representing power dissipated by the power supply using the input power value calculated by the input power module and the output power value calculated by the output power module; and
a fan module that adjusts the speed of a fan that cools the power supply based on the power dissipation value, the fan module increasing the fan speed in response to an increase in power dissipation and decreasing the fan speed in response to a decrease in power dissipation.

16. The system of claim 15, wherein the power supply is a multiple output power supply, the output module further configured to account for all output power of the power supply and wherein the output power value is the sum of individual output power values.

17. A method for controlling fan speed in a power supply, the method comprising:
measuring input power of a power supply;
calculating an input power value over an interval using the measurements of the input power;
measuring output power of the power supply;
calculating an output power value over an interval using the measurements of the output power;
calculating a power dissipation value representing power dissipated by the power supply by subtracting the input power value from the output power value;
increasing the speed of a fan that cools the power supply in response to an increase in the power dissipation value; and
decreasing the fan speed in response to a decrease in the power dissipation value.

18. The method of claim 17, further comprising associating a plurality of fan speeds with a plurality of power dissipation value ranges.

19. The method of claim 18, wherein the plurality of fan speeds are associated with the plurality of power dissipation value ranges in a lookup table.

20. The method of claim 18, further comprising increasing the fan speed over the fan speed associated with the power dissipation value for a lag interval in response to determining that the power dissipated by the power supply is decreasing.

* * * * *